(12) United States Patent
Omote et al.

(10) Patent No.: US 9,122,088 B2
(45) Date of Patent: Sep. 1, 2015

(54) CAPACITANCE TYPE TOUCH SCREEN

(75) Inventors: Ryomei Omote, Kyoto (JP); Hiroaki Matsumura, Kyoto (JP)

(73) Assignee: NISSHA PRINTING CO., LTD., Kyoto (JP)

( * ) Notice: Subject to any disclaimer, the term of this patent is extended or adjusted under 35 U.S.C. 154(b) by 225 days.

(21) Appl. No.: 14/008,203

(22) PCT Filed: Mar. 9, 2012

(86) PCT No.: PCT/JP2012/056192
§ 371 (c)(1),
(2), (4) Date: Sep. 27, 2013

(87) PCT Pub. No.: WO2012/132846
PCT Pub. Date: Oct. 4, 2012

(65) Prior Publication Data
US 2014/0016048 A1 Jan. 16, 2014

(30) Foreign Application Priority Data
Mar. 31, 2011 (JP) .................................. 2011-080810

(51) Int. Cl.
*G06F 3/045* (2006.01)
*G02F 1/1333* (2006.01)
*G06F 3/044* (2006.01)

(52) U.S. Cl.
CPC ............ *G02F 1/13338* (2013.01); *G06F 3/044* (2013.01)

(58) Field of Classification Search
None
See application file for complete search history.

(56) References Cited

FOREIGN PATENT DOCUMENTS

| JP | 03-027021 A | 2/1991 |
| JP | 2005-031790 A | 2/2005 |
| JP | 3145184 U | 9/2008 |
| JP | 2008-302600 A | 12/2008 |
| JP | 2010-146418 A | 7/2010 |

OTHER PUBLICATIONS

International Search Report of corresponding International Application No. PCT/JP2012/056192, dated on Jun. 12, 2012.
International Preliminary Report on Patentability of corresponding International Application No. PCT/JP2012/056192, dated on Oct. 8, 2013.

*Primary Examiner* — Kenneth B Lee, Jr.
(74) *Attorney, Agent, or Firm* — Global IP Counselors, LLP

(57) ABSTRACT

A capacitance type touch screen includes a cover lens and a film sensor. The film sensor includes a base film, first transparent electrodes arranged side by side extending in an A direction, second transparent electrodes insulated from the first electrodes and arranged side by side extending in B direction while crossing the first electrodes, a plurality of first lead wirings connected to the first electrodes and drawn to connection terminals, and a plurality of second lead wirings connected to the second electrodes and drawn to connection terminals. The first and second wirings are hidden by the cover lens decorated area. The film sensor includes a top-plate-corresponding-portion facing the cover lens top plate rear surface, and rising portions facing a rear surface of at least one of the first and second side plates. All or most of the second wirings is positioned in the rising portions.

18 Claims, 18 Drawing Sheets

CAPACITANCE TYPE TOUCH SCREEN

CROSS-REFERENCE TO RELATED APPLICATIONS

This U.S. National stage application claims priority under 35 U.S.C. §119(a) to Japanese Patent Application No. 2011-080810, filed in Japan on Mar. 31, 2011, the entire contents of Japanese Patent Application No. 2011-080810 are hereby incorporated herein by reference.

BACKGROUND

1. Field of the Invention

The present invention relates to a capacitance type touch screen exercising touch input function with a film sensor adhered to a rear surface of the cover.

2. Background Information

Conventionally, in personal digital assistants such as PDA and handy terminals, OA equipment such as copy machines, facsimiles, electronic devices such as smartphones, cellular phones, portable game devices, electronic dictionaries, car navigation systems, small PCs, and various household electrical appliances, a cover lens is provided in front of the liquid crystal display (LCD), in order to protect the surface of the liquid crystal display from the damage or contamination. In addition, recently, in order to improve convenience for input operation with signals, after assembling a laminated layer of a plate-like cover lens and a film sensor, the assembly is provided for use in front of the liquid crystal display of the electronic devices.

Specifically, there is a capacitance type touch screen including the following cover lens and film sensor. The cover lens is plate-like, and includes a see-through area and a decorated area other than the see-through area. The film sensor is adhered to a rear surface of the cover lens. The film sensor includes a base film, a plurality of first transparent electrodes, a plurality of second transparent electrodes, a plurality of first lead wirings, and a plurality of second lead wirings. The plurality of first transparent electrodes are provided side by side on the base film. The plurality of second transparent electrodes are insulated from the first transparent electrodes and are arranged side by side crossing the first transparent electrodes. The plurality of first lead wirings are connected to the first transparent electrodes and drawn to connection terminals. The plurality of second lead wirings are connected to the second transparent electrodes and drawn to connection terminals. In an overlapped portion of the cover lens and the film sensor, the first lead wirings and the second lead wirings are hidden by the decorated area.

Furthermore, there is a capacitance type touch screen disclosed in the Unexamined Patent Publication 2008-302600, which includes the following cover lens and the film sensor. The cover lens has a casing structure composed of a rectangular top plate, a first side plate connected to one side of the top plate, and a second side plate connected to another side of the top plate opposite to the first side plate. The film sensor is provided only on the rear surface of the top plate of the cover lens.

SUMMARY

However, as shown in Unexamined Patent Publication 2008-302600, since a configuration is employed in which the film sensor 103 is provided only on the rear surface of the top plate 121 of the cover lens 102, it is necessary to form a part of the top plate 121 of the cover lens 102 which covers the first lead wirings 107 and the second lead wirings 108 of the film sensor 103 as the decorated area 102B, not as the see-through area 102A, as shown in FIG. 18. Accordingly, a frame portion is defined in the peripheries of the top plate 121. Although the market has been demanding a further narrowing of the frame, the extent achievable by narrowing a pitch between lead wirings arranged side by side is limited.

In order to solve the problem, it is an object of the present invention to provide a capacitance type touch screen that makes it possible to achieve a non-conventional frame narrowing of the touch screen or that makes the touch screen frameless.

Hereinafter, a plurality of aspects as means for solving problems will be explained. The aspects can be combined with each other as necessary.

A capacitance type touch screen according to one aspect of the present invention includes a cover lens and a film sensor. The cover lens includes a top plate, and a first side plate and a second side plate connected to two sides of the top plate along a second direction perpendicular to a first direction of the top plate, the cover lens having a see-through area and a decorated area other than the see-through area.

The film sensor is adhered to a rear surface of the cover lens.

The film sensor includes a base film, a plurality of first transparent electrodes arranged on the base film side by side, extending in the first direction, a plurality of second transparent electrodes arranged side by side so as to extend in the second direction and cross the first transparent electrodes, while being insulated from the plurality of first transparent electrodes, a plurality of first lead wirings connected the first transparent electrodes and drawn to connection terminals, and a plurality of second lead wirings connected to the second transparent electrodes and led out to connection terminals.

The first lead wirings and the second lead wirings are hidden by the decorated area of the cover lens.

The film sensor includes a top plate corresponding portion opposite to the rear surface of the top plate of the cover lens, and a rising portion facing at least one of the rear surfaces of the first side plate and the second side plate.

All or most of the second lead wirings are positioned in the rising portion.

It is acceptable that an inside R size of a bent portion of the film sensor is 1 to 4 mm.

It is acceptable that a part of the second transparent electrodes is positioned in the rising portion.

In this case, the transparent electrodes positioned in the rising portion are formed as a conductive patterned layer including a binder resin and silver nanofiber or carbon nanotube in the binder resin.

The capacitance type touch screen may further comprise a flexible display disposed on the rear surface of the film sensor. In this case, the flexible display has a second rising portion corresponding to the rising portion of the film sensor. The see-through area of the cover lens extends from the top plate to the side plate, facing the rising portion of the film sensor.

It is acceptable that the film sensor has been molded so as to have the rising portion before the film sensor is adhered to the cover lens.

It is acceptable that the film sensor has been molded so as to extend along the first side plate and the second side plate of the cover lens.

It is acceptable that a lower end of the rising portion of the film sensor is positioned lower than a lower end of the corresponding side plate of the cover lens corresponding to the rising portion.

It is acceptable that the film sensor includes a first base film supporting the first transparent electrodes and the first lead wirings, and a second base film supporting the second transparent electrodes and the second lead wirings. The second base film is different from the first base film in size. In this case, the first base film corresponds to only the rear surface of the top plate, and the second base film includes a first portion corresponding to the rear surface of the top plate, and a second portion and a third portion respectively corresponding to the rear surfaces of the first side plate and the second side plate.

Since the capacitance type touch screen is configured as described above, the position where the lead line wirings are formed is not limited to within the top plate of the cover lens, so that the inner edge of the decorated area hiding the lead line wirings can be formed very close to the outer periphery of the top plate, thereby achieving non-conventional frame narrowing of the decorated area in the top plate, or making the decorated area frameless.

DETAILED DESCRIPTION OF EMBODIMENTS

Hereinafter, an embodiment will be explained with reference to drawings.

First Embodiment

Figure 1:
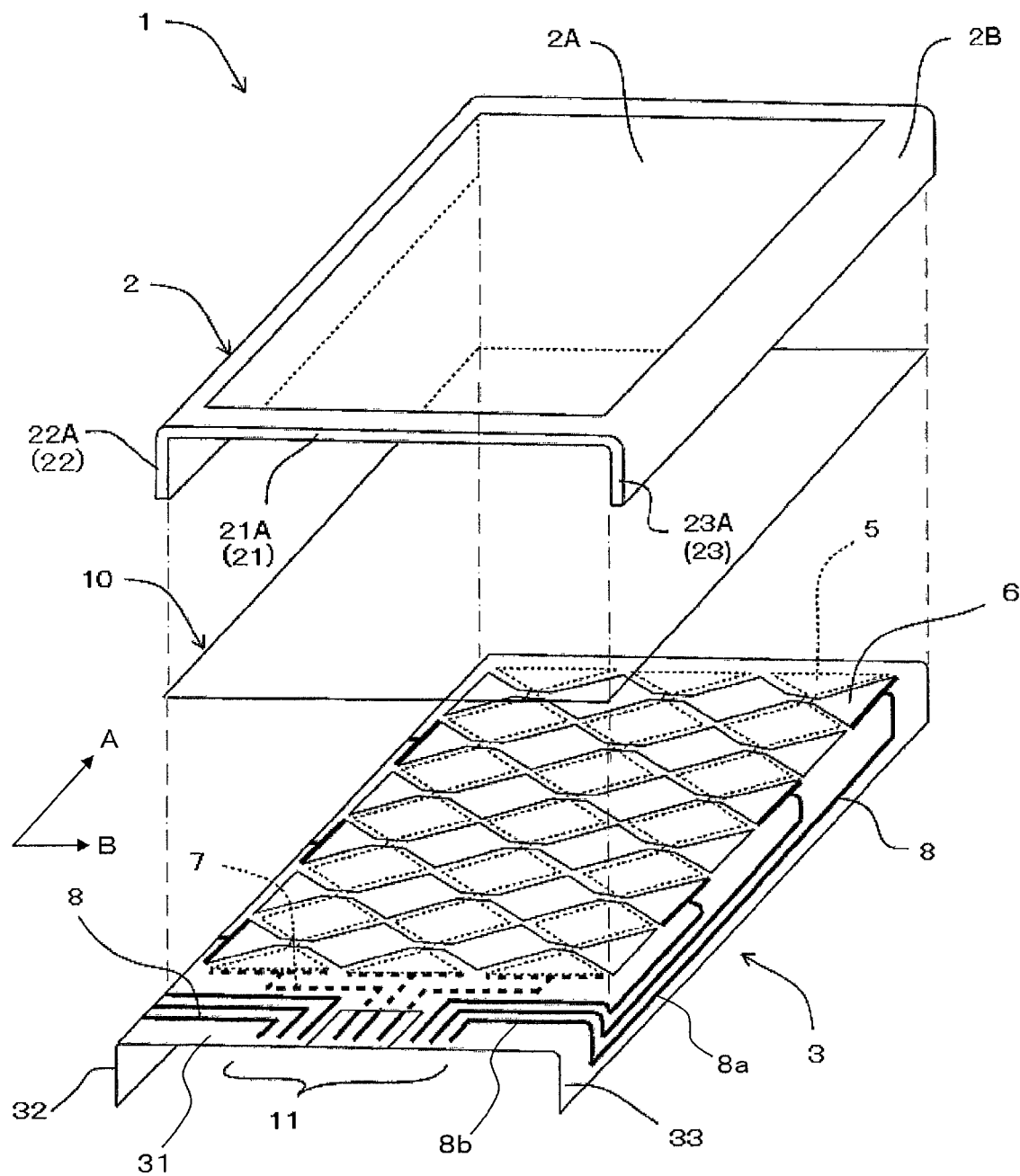
FIG. 1 is an exploded perspective view showing one disclosed embodiment of the capacitance type touch screen.
Figure 2:
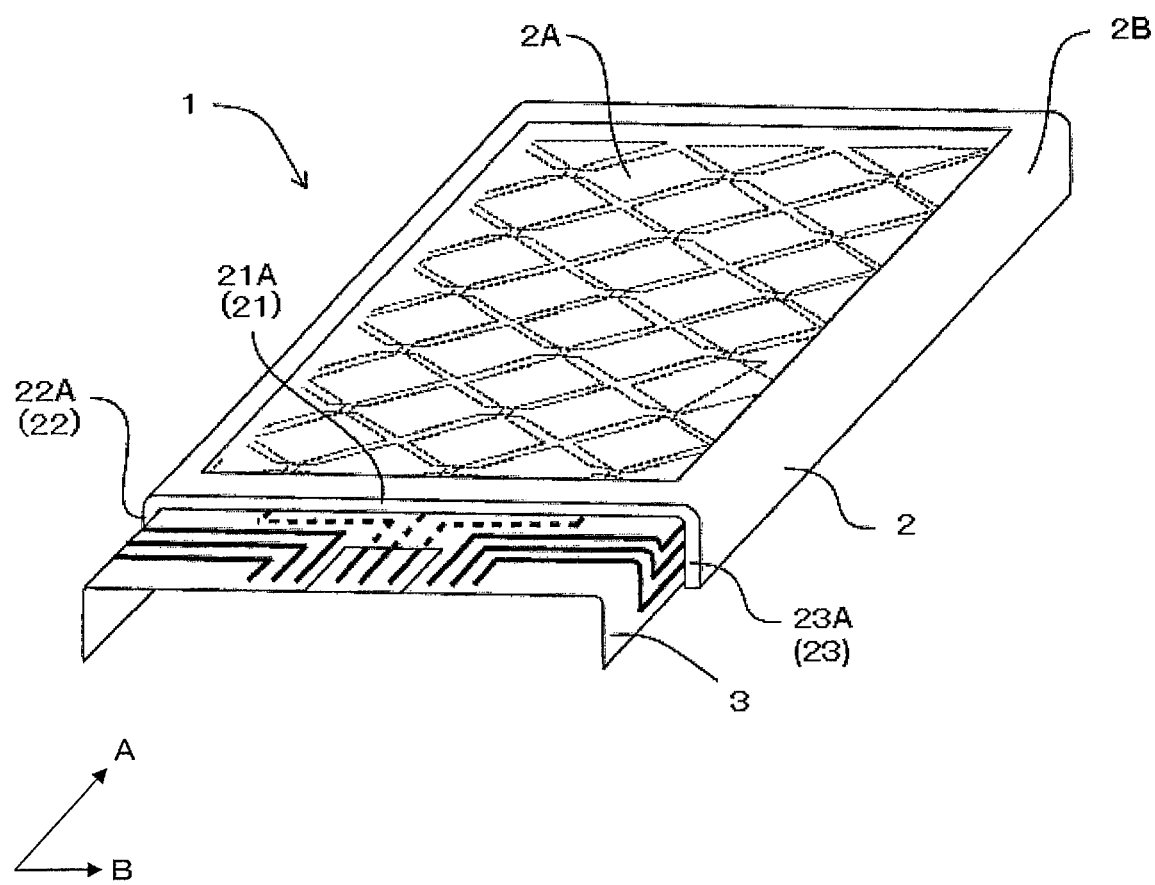
FIG. 2 is an assembly perspective view of the capacitance type touch screen shown in FIG. 1.

A touch screen 1 shown in FIG. 1 and FIG. 2 includes a cover lens 2, and a film sensor 3 adhered to a rear surface of the cover lens 2.

The cover lens 2 protects a display provided on a rear side of the cover lens 2 from external impact or the like. The cover lens 2 employs a casing structure composed of a rectangular top plate 21, a first side plate 22 of a thin rectangle connected to one side of the top plate 21, and a second side plate 23 of a thin rectangle connected to another side of the top plate 21 opposite to the first side plate 22. In this embodiment, the top plate 21 extends in A direction (first direction) in the figure, and the first side plate 22 and the second side plate 23 are connected to two sides of the top plate 21 along B direction (second direction), which is perpendicular to A direction. It should be noted that the top plate does not have to be rectangular, and the side plates do not have to be thin rectangles.

The top plate 21 of the cover lens 2 is preferably planar, typically. The reason is that if the top plate 21 were a curved surface, air or air bubbles might enter between the cover lens 2 and the film sensor 3 when the film sensor 3 is adhered along the rear surface of the top plate 21, thereby deteriorating the touch input function and the appearance of the touch input screen.

The material for the cover lens 2 has to have a high transparency and impact resistance, and may be a glass plate, a resin plate or the like. The material for the glass plate is preferably a chemically strengthened glass, and the material for the resin plate is preferably acrylic resin, polycarbonate resin or the like.

The thickness of the cover lens 2 is preferably 0.5 to 2 mm. If the thickness is beyond 2 mm, problems are likely to occur, such as extreme decrease in the light transmittance, blurring of the image on the display provided on the rear side of the cover lens 2, and darkening of the image color. In contrast, if the thickness is below 0.5 mm, the cover lens 2 cannot withstand various external impacts when in use, and cannot protect the display provided on the rear side of the cover lens 2.

The cover lens 2 includes a see-through area 2A through which image on the display provided on the rear side thereof is seen, and an opaque decorated area 2B other than the see-through area 2A. The decorated area 2B serves as a part for hiding wirings which connect the transparent electrodes of the film sensor 3 to a control circuit.

An optically transparent adhesive (Optical Clear Adhesive: OCA) 10 is used to adhere the film sensor 3 to the cover lens 2. According to the present embodiment, the optically transparent adhesive 10 is provided on at least the rear surface of the top plate 21 of the cover lens 2. As shown in FIG. 1, since the optically transparent adhesive 10 is provided only on the rear surface of the top plate 21, it is easy to adhere the film sensor 3 to the cover lens 2. In contrast, if the optically transparent adhesive 10 were provided on the rear surfaces of the first side plate 22 and second side plate 23 as well as the rear surface of the top plate 21, the film sensor 3 can be reliably adhered to the cover lens 2.

The optically transparent adhesive 10 can be made of acrylic adhesive and rubber adhesive, and the acrylic adhesive is preferable in light of transparency. Such adhesive may contain, other than tacky polymer component, plasticizer, adhesiveness applying component, or the like, but additives that may deteriorate transparency are not preferable. As the tacky polymer that is the main component of the acrylic adhesive, copolymer of a mixture of monomers may be preferably used, and may include, as a main component, (meta) acrylic ester in which carbon number of alkyl group is 1 to 10 such as ester 2-ethylhexyl acrylate, butyl acrylate, isooctyl acrylate, butyl methacrylate, and propyl methacrylate, and unsaturated monomer with functional groups such as acrylic acid, methacrylic acid, maleic acid, fumaric acid, hydroxyethyl acrylate, hydroxyethyl methacrylate. In addition, as the tacky polymer that is the main component of the rubber adhesive, stylene/butadiene random copolymer, stylene/isoprene block copolymer, and natural rubber may be preferably used.

The film sensor 3 includes, as a basic structure, a base film 4, a plurality of first transparent electrodes 5, a plurality of second transparent electrodes 6, a plurality of first lead wirings 7, and a plurality of second lead wirings 8. The plurality of first transparent electrodes 5 are provided side by side on the base film 4. The plurality of second transparent electrodes 6 are insulated from the first transparent electrodes 5, and are provided side by side crossing the first transparent electrodes 5. The plurality of first lead wirings 7 are connected to the first transparent electrodes 5, and are drawn to the connection terminals. The plurality of second lead wirings 8 are connected to the second transparent electrodes 6, and are drawn to the connection terminals. In the overlapped portion of the cover lens 2 and the film sensor 3, the first lead wirings 7 and the second lead wirings 8 are hidden by the decorated area 2B.

The first transparent electrodes 5 extend in A direction in the figure, and the second transparent electrodes 6 extend in B direction in the figure.

The film sensor 3 includes a top-plate-corresponding-portion 31 opposite to the rear surface of the top plate 21A of the cover lens 2, and rising portions 32, 33 facing respectively the rear surfaces of the first side plate 22A and the second side plate 22B of the cover lens 2.

The second lead wirings 8 includes a first portion 8a corresponding to the rising portions 32, 33, and a second portion 8b corresponding to the top-plate-corresponding-portion 31. More specifically, the first portion 8a includes a portion extending from the second transparent electrodes 6 in the width direction of the rising portions 32, 33, a portion extending in the length direction of the rising portions 32, 33 (A direction in the figure), and a portion extending from the second portion 8b in the width direction of the rising portions 32, 33. According to the present embodiment, there is a larger amount of the first portion 8a in the second lead wirings 8 than that of the first portion 8a. The second portion 8b preferably occupies 70% or more of the entire second lead wirings 8, more preferably 80% or more, further preferably 90% or more.

While the film sensor 3 has the above-described basic structure, there are several kinds of film sensor 3 which have different configuration or use from each other in minor aspects. Examples (1) to (7) are shown hereinbelow.

(1) Single Base Layer Type (Face Up)

Figure 7:
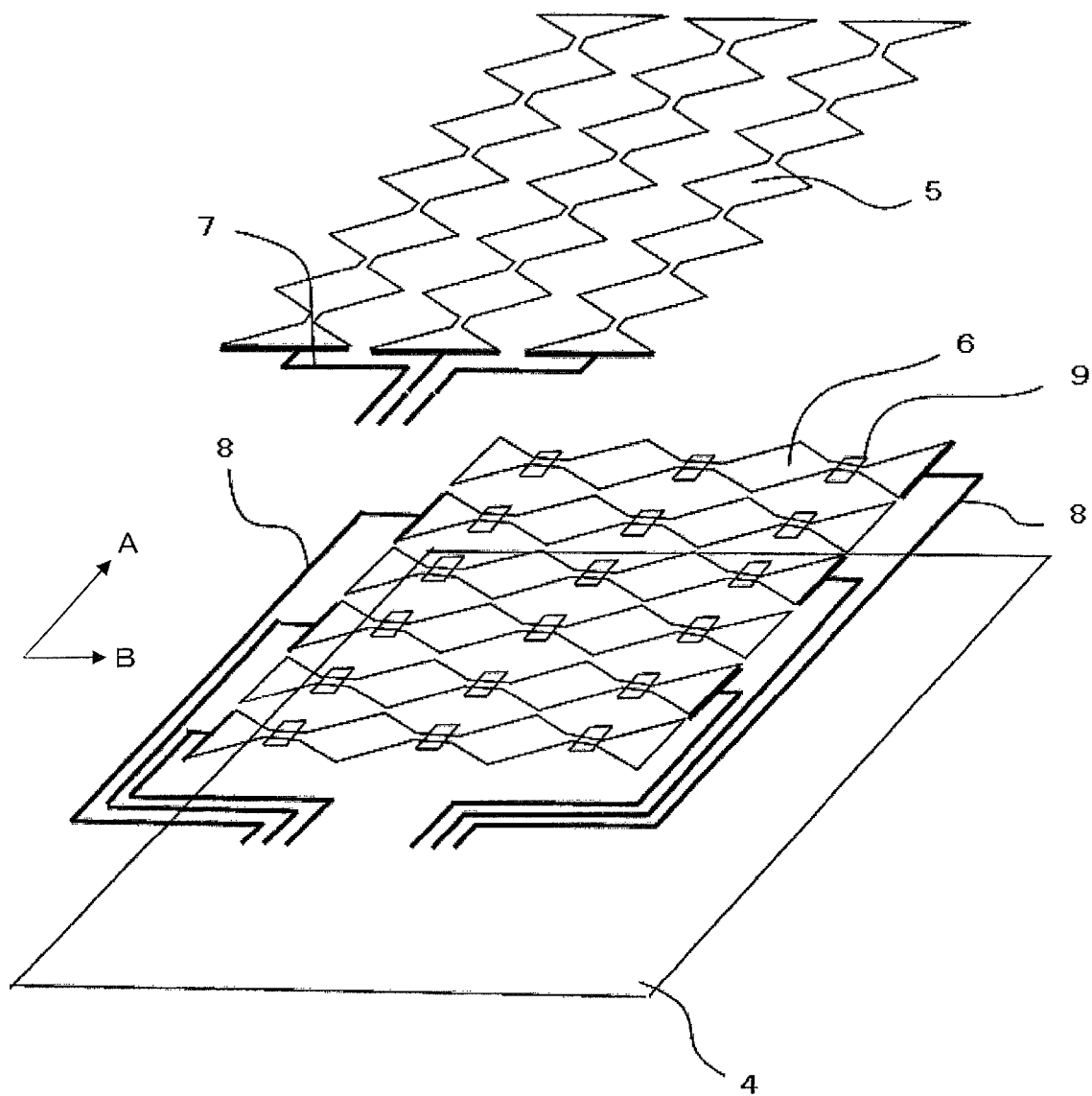
FIG. 7 is an exploded perspective view showing one example of the film sensor used in the disclosed embodiments.

Referring to FIG. 7, the film sensor 3 includes a base film 4, a plurality of first transparent electrodes 5, a plurality of second transparent electrodes 6, intermediate insulation layers 9, a plurality of first lead wirings 7, and a plurality of second lead wirings 8. The plurality of first transparent electrodes 5 are provided side by side on the base film 4. The plurality of second transparent electrodes 6 are provided on a surface of the base film 4 on which the first transparent electrodes 5 are formed, and are arranged side by side crossing the first transparent electrodes 5. The intermediate insulation layers 9 are provided between the crossing portions of the first transparent electrodes 5 and the second transparent electrodes 6. The plurality of first lead wirings 7 are connected to the first transparent electrodes 5, and are drawn to connection terminals. The plurality of second lead wiring 8 are connected to the second transparent electrodes 6, and are drawn to connection terminals. A side of the film sensor 3 corresponding to the base film 4 faces the cover lens 2.

(2) Single Base Layer Type (Face Down)

A side of the film sensor 3 opposite to the base film 4 faces the cover lens 2, and the rest of the structure is the same as that in the above (1).

(3) Single Base Layer Type (Both Surfaces)

Figure 8:
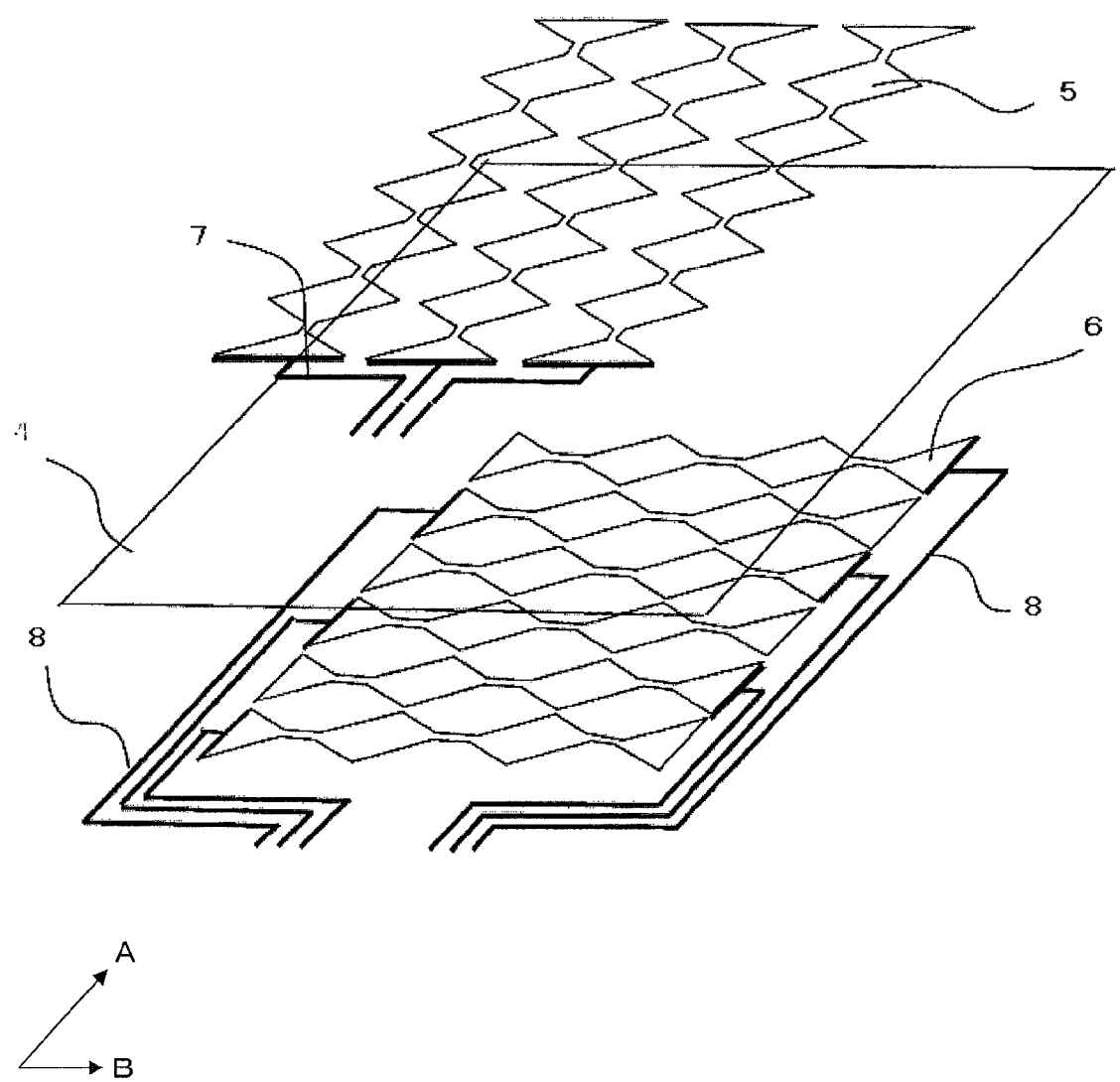
FIG. 8 is an exploded perspective view showing one example of the film sensor used in the disclosed embodiments.

The film sensor 3 includes, as shown in FIG. 8, a base film 4, a plurality of first transparent electrodes 5, a plurality of second transparent electrodes 6, a plurality of first lead wirings 7, and a plurality of second lead wirings 8. The plurality of first transparent electrodes 5 are arranged side by side on the base film 4. The plurality of second transparent electrodes 6 are arranged side by side on a surface of the base film 4 opposite to the surface on which the first transparent electrodes 5 are formed, crossing the first transparent electrodes 5. The plurality of first lead wirings 7 are connected to the first transparent electrodes 5, and are drawn to the connection terminals. The plurality of second lead wirings 8 are connected to the second transparent electrodes 6, and are drawn to the connection terminals.

(4) Double Base Layer Type (Face Up)

Figure 9:
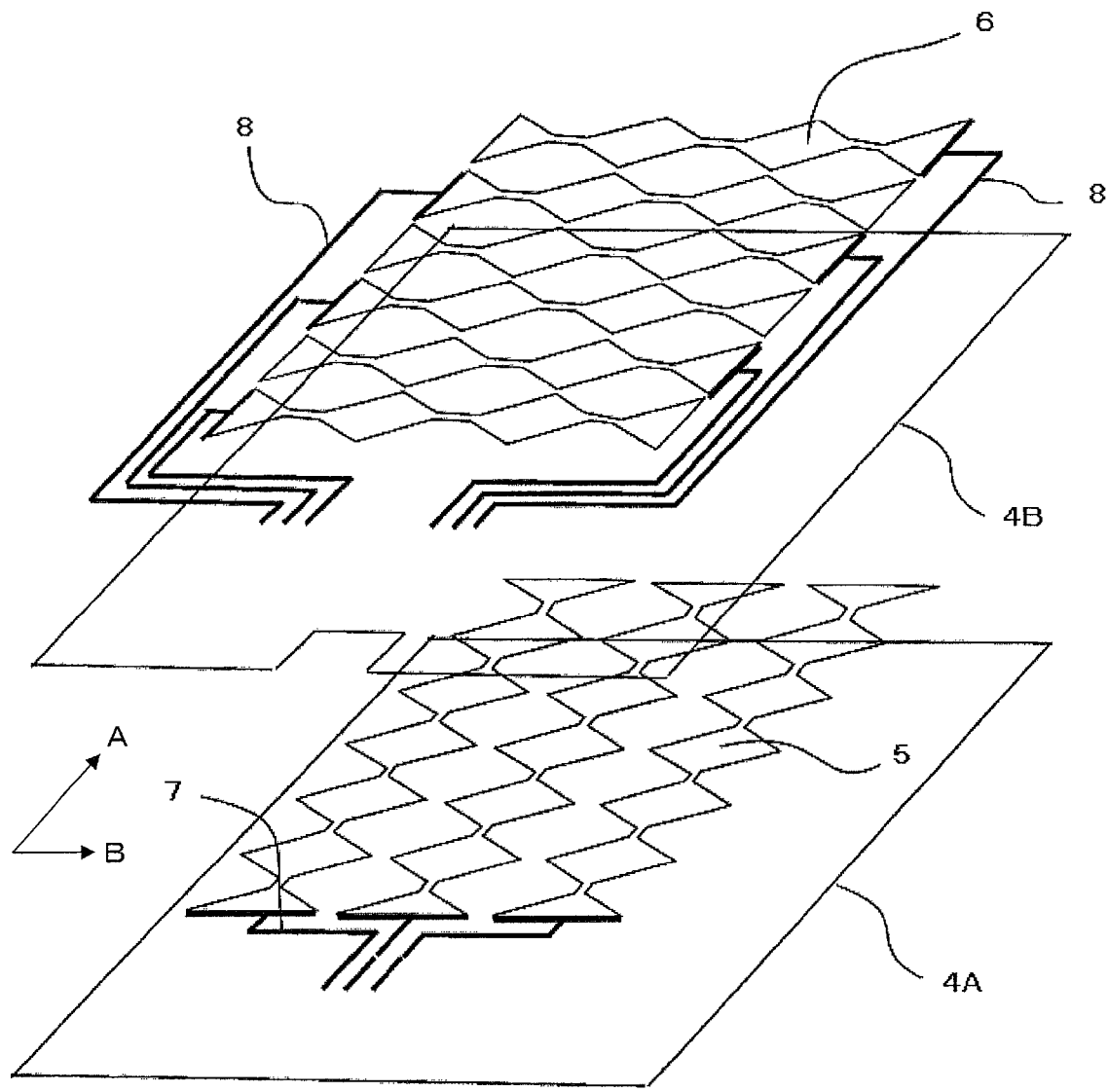
FIG. 9 is an exploded perspective view showing one example of the film sensor used in the disclosed embodiments.

Unlike the above (1) through (3), the film sensor 3 includes an additional base film. The film sensor 3 includes, as shown in FIG. 9, a first base film 4A, a plurality of first transparent electrodes 5, a plurality of first lead wirings 7, a second base film 4B, a plurality of second transparent electrodes 6, and a plurality of second lead wirings 8. The plurality of first transparent electrodes 5 are arranged side by side on the first base film 4A. The plurality of first lead wirings 7 are connected to the first transparent electrodes 5, and are drawn to the connection terminals. The second base film 4B is adhered to and covers the first transparent electrodes 5 and the first lead wirings 7 except the connection terminals. The plurality of second transparent electrodes 6 are arranged side by side on the second base film 4B, crossing the first transparent electrodes 5. The plurality of second lead wirings 8 are, on the second base film 4B, connected to the second transparent electrodes 6, and are drawn to the connection terminals. The first base film 4A faces the cover lens 2.

(5) Double Base Layer Type (Face Down)

The second base film 4B faces the cover lens 2, and the rest of the structure is the same as that of the above (4).

(6) Double Base Layer Type (Both Surfaces)

Figure 10:
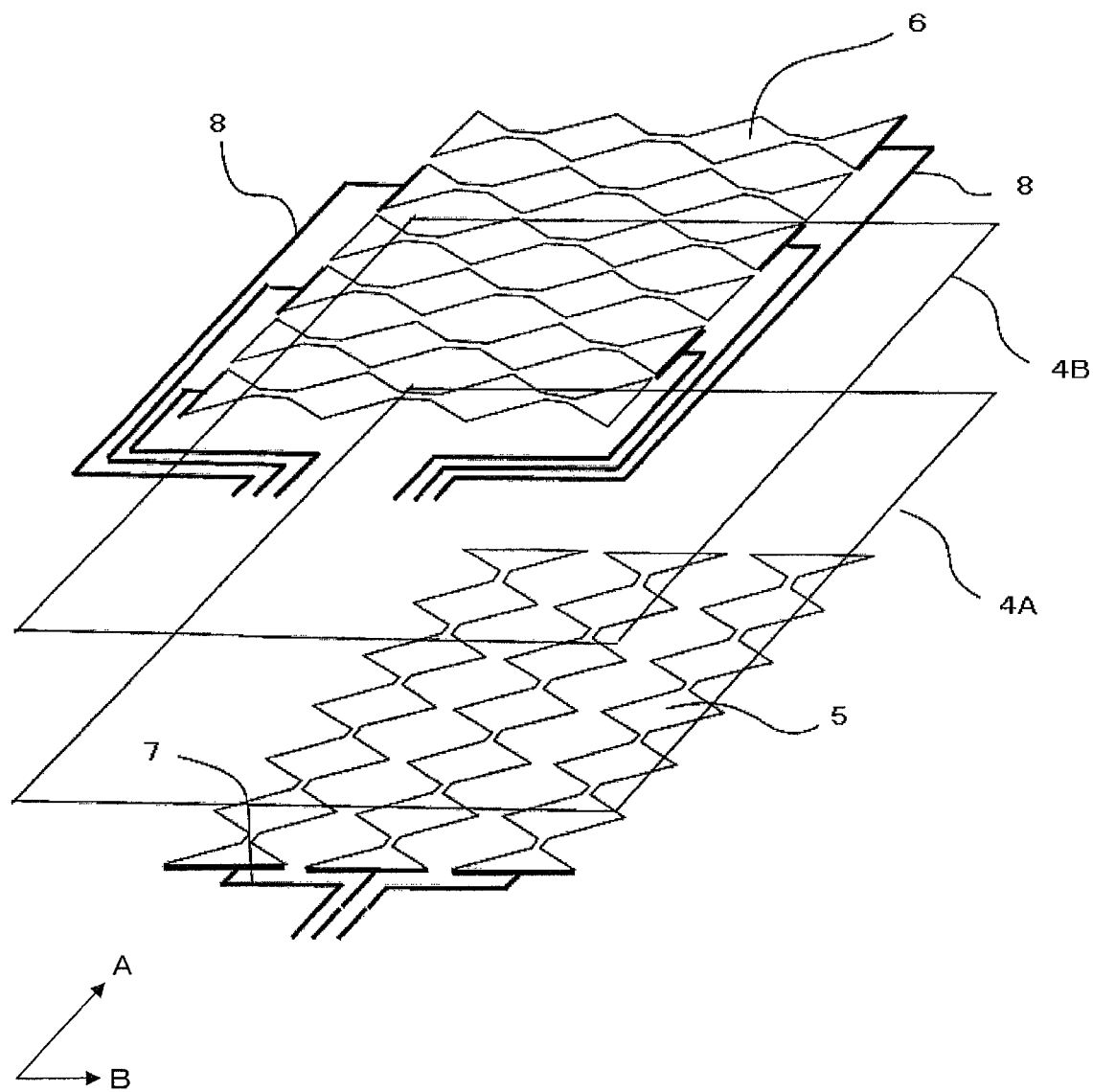
FIG. 10 is an exploded perspective view showing one example of the film sensor used in the disclosed embodiments.

Unlike the above (1) through (3), the film sensor 3 includes an additional base film. The film sensor 3 includes, as shown in FIG. 10, a first base film 4A, a plurality of first transparent electrodes 5, a second base film 4B, a plurality of second transparent electrodes 6, a plurality of first lead wirings 7, and a plurality of second lead wiring 8. The plurality of first transparent electrodes 5 are arranged on the first base film 4A. The second base film 4B is adhered to a surface of the first base film 4A opposite to the surface on which the first transparent electrodes 5 are formed. The plurality of second transparent electrodes 6 are arranged side by side on the surface of the second base film 4B opposite to the surface on which the first base film 4A is adhered, crossing the first transparent electrodes 5. The plurality of first lead wirings 7 are connected to the first transparent electrodes 5, and are drawn to the connection terminals. The plurality of second lead wirings 8 are connected to the second transparent electrodes 6, and are drawn to the connection terminals.

(7) Having a Shield Layer

In addition to the configuration of the above (1) through (6), a shield film (not shown) is adhered to a backend surface of the film sensor 3.

The material for base films 4, 4A, 4B may be a transparent film of, for example, polyester (PET), polyimide (PI), polyethersulfone (PES), polyether ether ketone (PEEK), polycarbonate (PC), polypropylene (PP), polyamide (PA), polyacryl (PAC), and transparent thermoplastic norbornene resin, or their laminates. Cycloolefin polymer (COP) can be used too.

Regarding the typical thickness of the base films 4, 4A, 4B, in general, the thickness of the individual film is 20 μm or more, and the total thickness of the films used in the film sensor 3 is 500 μm or less. If the thickness of the individual film is below 20 μm, it becomes difficult to handle the film during manufacturing, and if the total thickness is beyond 500 μm, the translucency is deteriorated.

In the case of the film sensor 3 in the above (4) through (6) of the double base layer type, a base film, which supports the lead wirings which are not disposed on a portion corresponding to the first side plate 22 and the second side plate 23, can be designed to a size such that the base film is disposed only on a side close to the rear surface of the top plate 21 of the cover lens 2.

Figure 16:
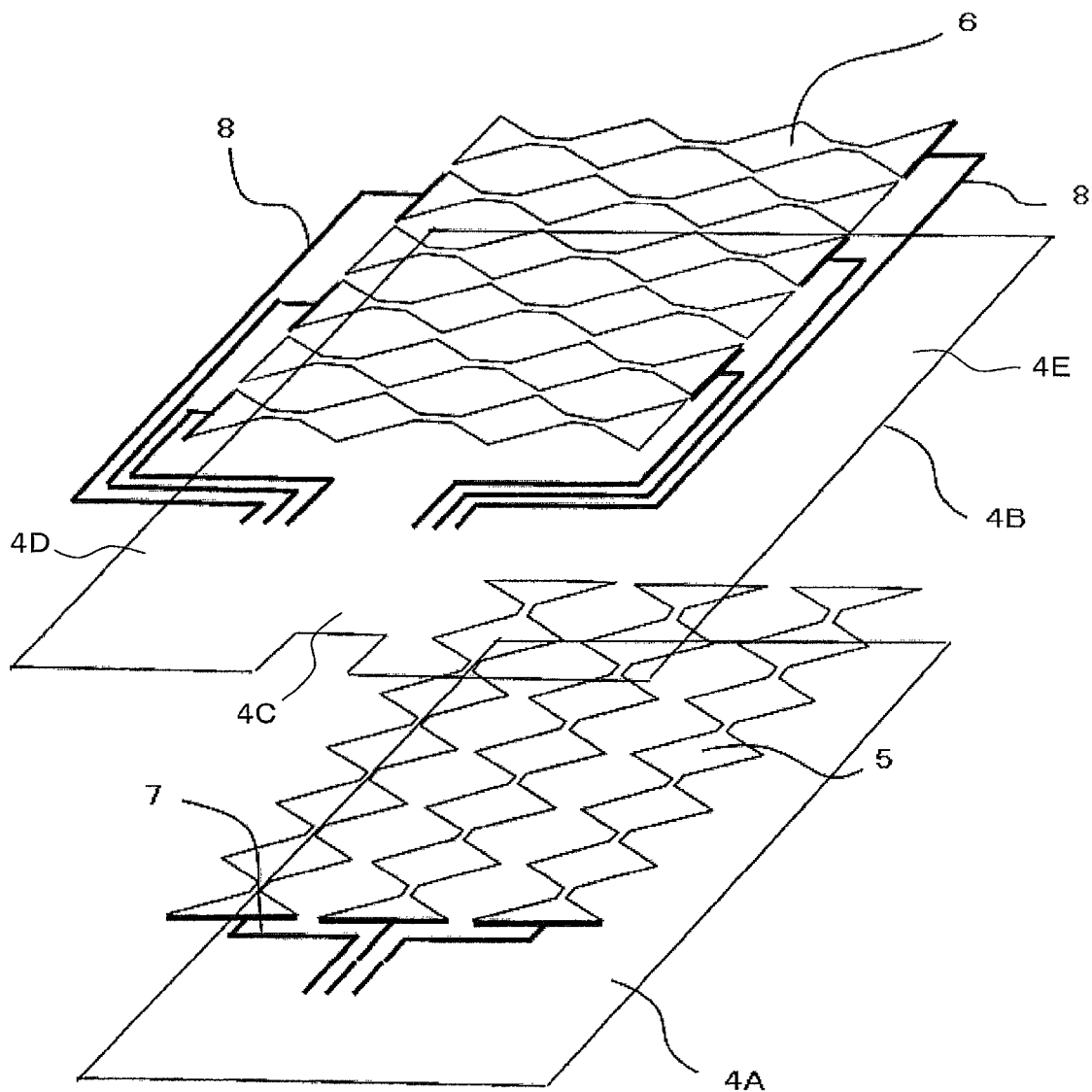
FIG. 16 is an exploded perspective view showing one example of the film sensor according to the disclosed embodiments.

For example, as shown in FIG. 16, the film sensor 3, adhered to the rear surface of the cover lens 2, includes a first base film 4A, a plurality of first transparent electrodes 5, a second base film 4B, a plurality of second transparent electrodes 6, a plurality of first lead line wirings 7, and a plurality of second lead line wirings 8. The plurality of first transparent electrodes 5 are arranged side by side on the first base film 4A. The second base film 4B is different from the first base film 4A in size. The second transparent electrodes 6 are insulated from the first transparent electrodes 5, and are arranged on the second base film 4B, crossing the first transparent electrodes 5. The plurality of first lead wirings 7 are connected to the first transparent electrodes 5, and are drawn to the connection terminals. The plurality of second lead wirings 8 are connected to the second transparent electrodes 6, and are drawn to the connection terminals. In an overlapped portion of the cover lens 2 and the film sensor 3, the first lead wirings 7 and the second lead wiring 8 are hidden by a decorated area 2B.

As shown in FIG. 16, the first base film 4A, supporting the first transparent electrodes 5 and the first lead wirings 7, is disposed only on a side close to the rear surface of the top plate 21, and the second base film 4B, supporting the second transparent electrodes 6 and the second lead wirings 8, is disposed at portions that also include those corresponding to the rear surfaces of the first side plate 22 and the second side plate 23. More specifically, the second base film 4B includes a first portion 4C corresponding to the rear surface of the top plate, a second portion 4D and a third portion 4E respectively corresponding to the rear surfaces of the first side plate 22 and the second side plate 23.

In this case, it is substantially necessary to face only one of the two base films to the side plates. Accordingly, it is easy to bend the film sensor 3 and adhere the film sensor 3.

The pattern of the first transparent electrodes 5 and the second transparent electrodes 6 will be explained with reference to FIG. 14.

The first transparent electrodes 5 include rhombic electrodes 51, which look rhombic when viewed in a planar manner, and connection wirings 52 penetrating the rhombic electrodes 51 in a vertical direction in the figure (Y direction). The plurality of rhombic electrode 51 and the connection wirings 52 are electrically connected with each other. The connection wirings 52 and the plurality of rhombic electrode 51 penetrated by the connection wirings 52 are defined as one set, and the one set is repeatedly arranged in a lateral direction (X direction). On the other hand, the second transparent electrodes 6 include a plurality of rhombic electrodes 61, and connection wirings 62 penetrating the rhombic electrodes 61. In this case, the extending direction of the connection wirings 62 is a lateral direction (X direction) in the figure, unlike that of the connection wirings 52. Accordingly, a set of the connection wirings 62 and plurality of rhombic electrodes 61 penetrated by the connection wiring 62 is repeatedly arranged in the vertical direction in the figure (Y direction).

Figure 14:
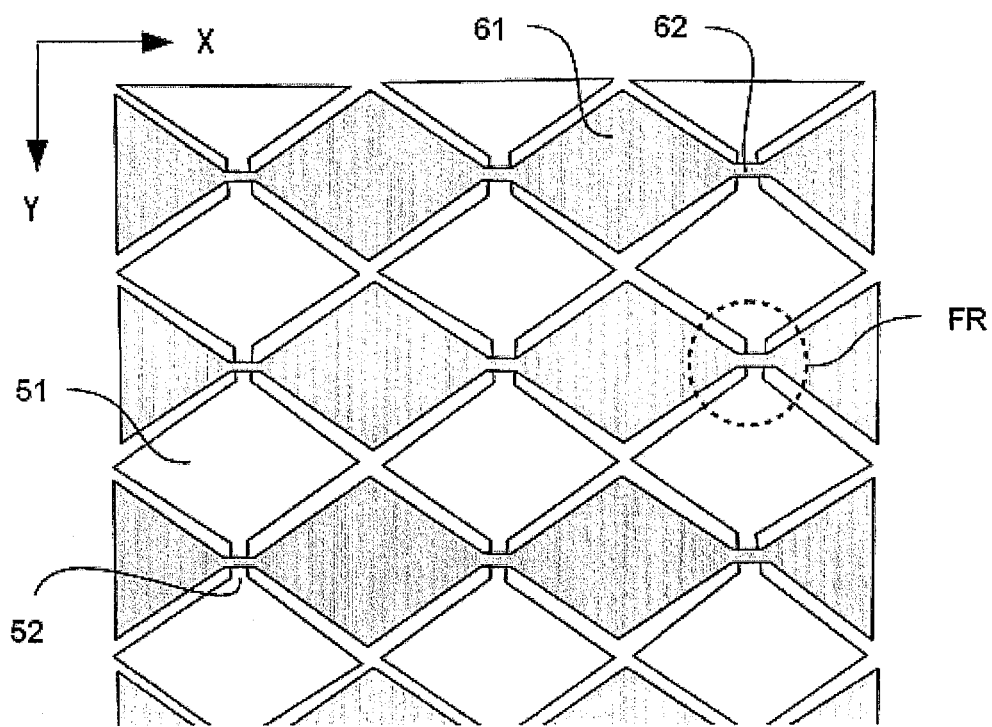
FIG. 14 is a partially enlarged view showing one example of the transparent electrode portion of the film sensor.

As apparent from FIG. 14, the rhombic electrodes 51 and the rhombic electrodes 61 are arranged to be complementary with each other. In other words, the plurality of rhombic electrodes 61 are arranged so as to fill rhombic gaps defined when the rhombic electrodes 51 are arranged in a matrix. In FIG. 14, triangle electrodes are provided at the ends of the groups of the rhombic electrodes 51, 61 aligned in one line. The triangle electrodes are provided in order to form a rectangular sensor effective area corresponding to the rectangular see-through area 2A, and to avoid what is called skeletal structure of the electrodes in which the transmittance becomes uneven. The triangle electrodes can be omitted.

Since the X-direction electrodes and Y-direction electrodes are arranged so as to form a lattice in a plane view, if a finger of the user or the like touches any position on the lattice via the cover lens 2 covering the film sensor 3 (position indicated by a circle FR of the dashed line), a capacitor is formed between the finger or the like and the X-direction electrode touched by the finger, and a capacitor is formed between the finger or the like and the Y-direction electrode touched by the finger. The formation of the capacitor increases the capacitance of the X-direction electrode and the Y-direction electrode touched by the finger. A position detecting unit in an outside circuit detects the amount of change in capacitance occurring in this case, or detects the X-direction electrode and Y-direction electrode having the largest capacitance. Accordingly, it is possible to obtain a location where the finger touches in the see-through area 2A as a set of X-coordinate value and Y-coordinate value having a particular value The materials of the first transparent electrodes 5 and the second transparent electrodes 6 preferably exert a light transmittance (translucency) of 80% or more and a surface resistance value (conductivity) of a few mΩ to a few hundred Ω. The electrodes can be formed by a metallic oxide such as indium oxide, tin oxide, indium tin oxide (ITO), and tin antimonite, or a metal such as gold, silver, copper, platinum, palladium, aluminum, and rhodium. As methods of forming the first transparent electrodes 5 and the second transparent electrodes 6 made of the above-described materials, there exist methods such as forming a transparent conductive film with a method such as PVD methods such as a sputtering method, a vacuum deposition method, and an ion plating method, a CVD method, or a coating method and then patterning is performed through etching, and a printing method.

The first lead wirings 7 and the second lead wirings 8 are typically formed by screen printing, but the forming method is not particularly limited. The material for the first lead wirings 7 and the second lead wirings 8 is generally a silver paste, a copper paste, or a paste of silver and carbon, but other materials can be selected as long as the material keeps a constant volume resistance and is stable.

The first lead wirings 7 and the second lead wirings 8 can be constituted with a dual layer structure including a transparent conductive layer made of the same material as that of the first transparent electrodes 5 and the second transparent electrodes 6, and a metallic layer laminated on the transparent conductive layer. The material for the metallic layer may be aluminum, nickel, copper, silver, tin, and so on, for example. As methods of forming the first lead wirings 7 and the second lead wirings 8, there exists a method in which the transparent conductive film and the metallic film are laminated with a PVD method such as a sputtering method, a vacuum deposition method, and an ion plating method, a CVD method, or a coating method, and then patterning is performed through etching.

The materials for the intermediate insulation layer 9 in the examples (1) and (2) may be thermosetting resin such as polyester resin, and ultraviolet curable resin such as acrylic resin.

The shield film in the example (7) may be formed by forming a transparent conductive film, made of the same material as that of the first transparent electrodes 5 and the second transparent electrodes 6, onto an entire surface of a resin film made of the same material as that of the base film 4.

For the adhesion when using a plurality of films in the examples (4) through (7), the optically transparent adhesive 10 is used for adhering the film sensor 3 to the cover lens 2 (in the figures, the optically transparent adhesive 10 is omitted.).

The feature of the present embodiment includes using a molded film sensor 3. In the first embodiment, the film sensor 3 includes, as shown in FIG. 1, the rising portions 32, 33 so as to face the rear surfaces of the top plate 21, the first side plate 22 and the second side plate 23 of the cover lens 2. Most of the lead line wirings 8, connected to the plurality of second transparent electrodes 6 that have an axis extending in a direction perpendicular to the rising portion 32, 33, are disposed in a portion of the rising portions corresponding to the first side plate 22 and the second side plate 23.

Since this configuration makes it possible for the lead line wirings to be formed at positions that are not only within the top plate 21 of the cover lens 2, the inner edge of the decorated area 2B that hides the lead line wirings can be formed very close to the outer periphery of the top plate 21, so that frame narrowing of the decorated area 2B is achieved in the top plate 21. In the ideal situation, the top plate 21 can be frameless.

Among the film sensors 3 exemplified in the above (1) to (7), in the film sensors 3 in the examples (1), (3), (4) and (6), as shown in FIG. 1 and FIG. 2, the molded film sensor 3 extends off from one of the two sides 21A where the first side plate 22 and the second side plate 23 are not formed, one end 22A (which is either the right end or the left end) of the first side plate 22 near the side 21A of the top plate 21, and one end 23A (which is either the right end or the left end) of the second side plate 23 near the side 21A of the top plate 21, such that the connection terminals 11 of the first lead wirings 7 and the second lead wirings 8 are not covered by the cover lens 2.

This configuration makes it possible for the FPC (not shown) connected at the connection terminals 11 not to be positioned between the cover lens 2 and the film sensor 3, so that it is easier to adhere the film sensor 3 to the cover lens 2 and the FPC does not go off after getting stuck with the end surface of the cover lens 2.

It is preferable that the film sensor 3 is risen to have an inside R size of 1 to 4 mm. Due to the roundness of the inside R size of 1 mm or more, and not being a right angle, at parts of the film sensor 3 that correspond to the first side plate and the second side plate, it is possible to prevent the lead line wirings from being destroyed and broken. It should be noted that, if the inner R size is beyond 4 mm, the frame narrowing effect is reduced.

Although the film sensor 3 is positioned so as to correspond to the rear surfaces of the top plate 21, first side plate 22 and second side plate 23 of the cover lens 2, the front surface shape of the film sensor 3 according to the present embodiment does not have to correspond to the rear surface shape of the cover lens 2 completely. In other words, it includes the shape of the front surface of the film sensor 3 that is similar to the shape of the rear surface of the cover lens 2, e.g., there may be a wider distance between the outer R portion of the film sensor 3 and the cover lens 2.

In addition, according to the present embodiment, the size of the film sensor 3 is designed so as to satisfy the following conditions. The lower end of the molded film sensor 3 is positioned at the same level with or higher than the lower ends of the first side plate 22 and second side plate 23 of the cover lens 2. This configuration makes it possible to reduce the height of the electronic devices incorporating the touch screen 1.

Second Embodiment

Figure 3:
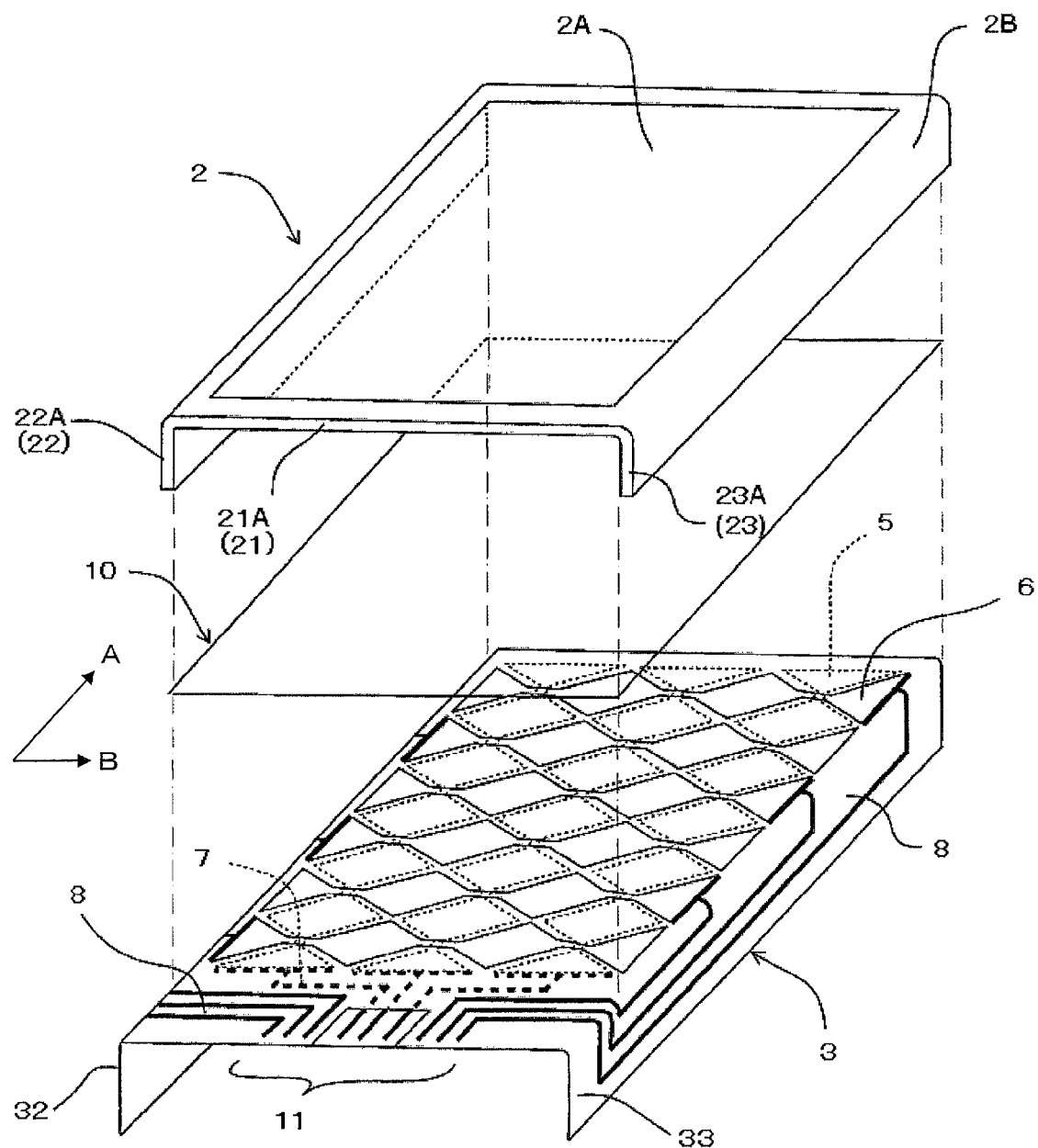
FIG. 3 is an exploded perspective view showing another embodiment of the capacitance type touch screen.
Figure 4:
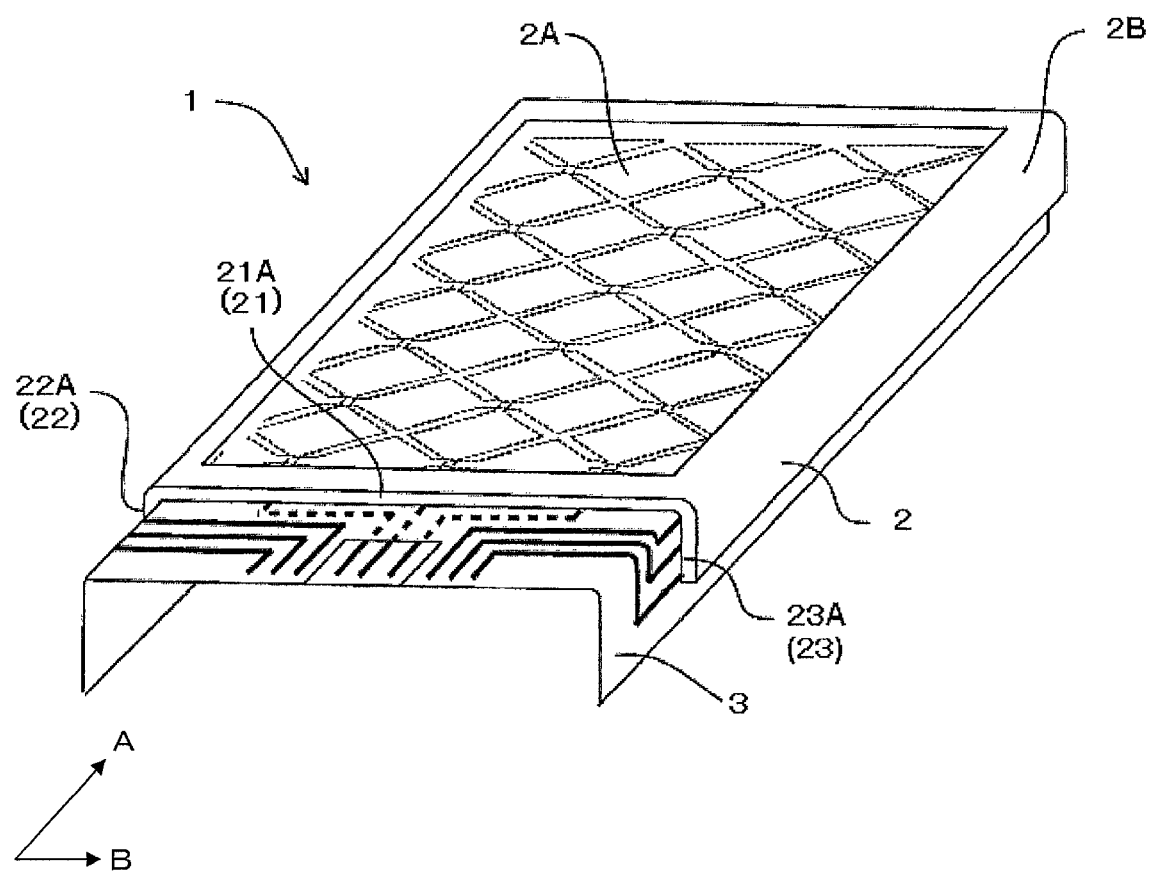
FIG. 4 is an assembly perspective view showing a capacitance type touch screen shown in FIG. 3.

The touch screen 1 according to the present embodiment is different from one according to the first embodiment in that the size of the film sensor 3 is designed such that the lower end of the molded film sensor 3 is positioned lower than the lower ends of the first side plate 22 and second side plate 23 of the cover lens 2 (Refer to FIG. 3 and FIG. 4).

This configuration allows users to grab a portion sticking out from the cover lens 2 when the film sensor 3 is to be adhered to the cover lens 2, thereby improving the handling of the film sensor 3.

Third Embodiment

Figure 17:
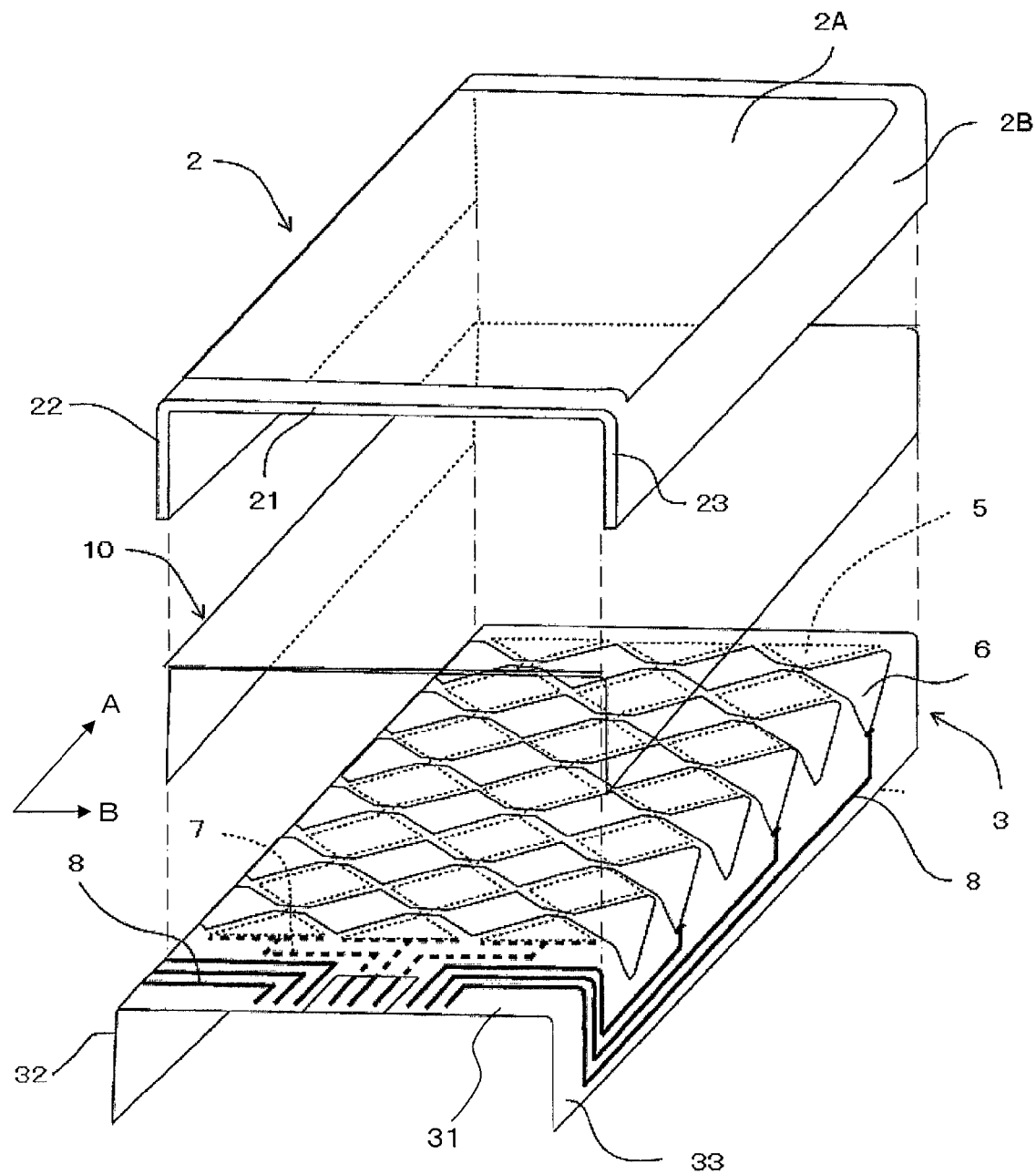
FIG. 17 is an exploded perspective view showing the other embodiment of the capacitance type touch screen.
Figure 18:
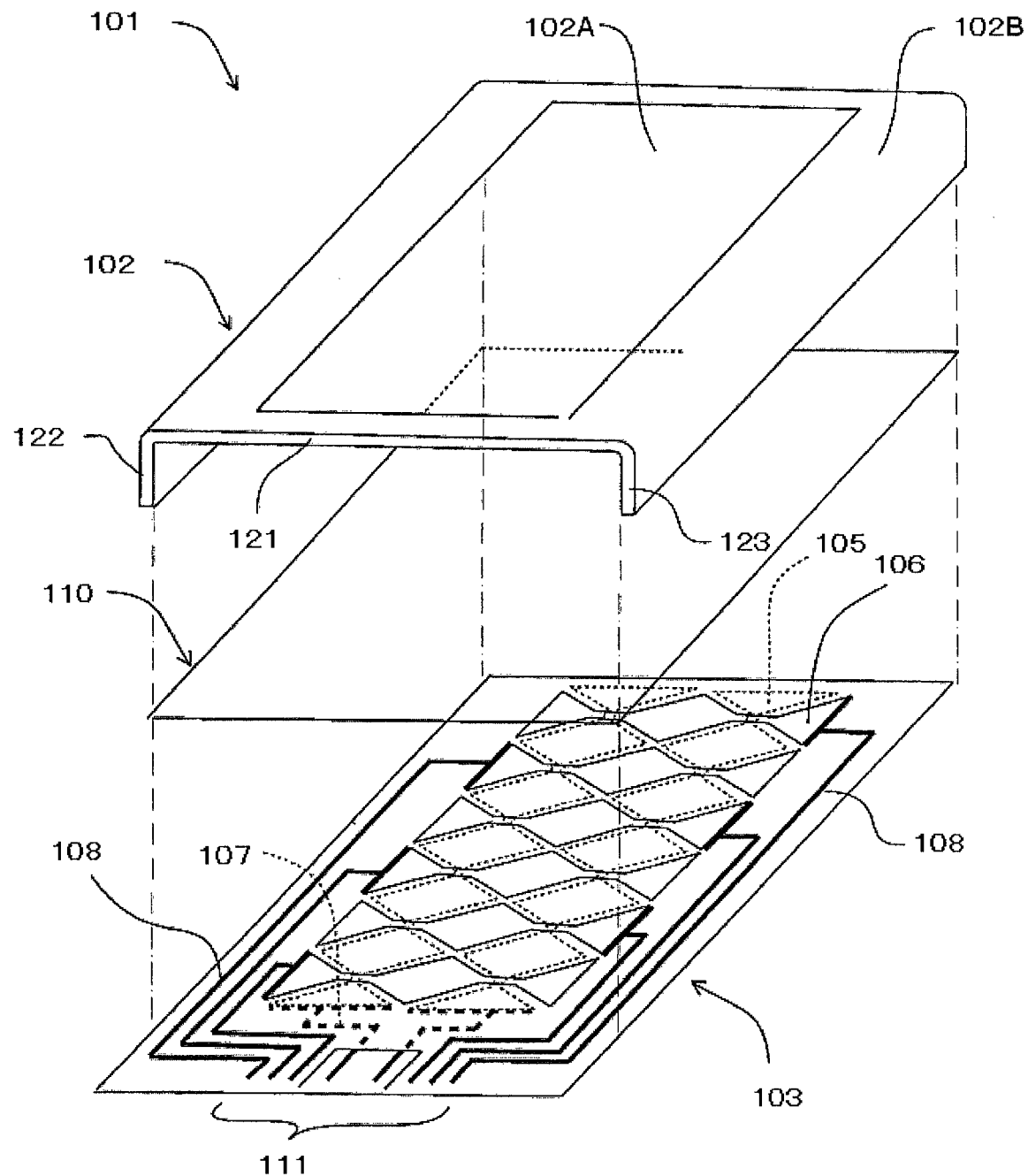
FIG. 18 is an exploded perspective view showing one example of conventional capacitance type touch screen.

In the touch screen 1 according to the present embodiment, at least one of the first transparent electrodes 5 and the second transparent electrodes 6 may be present in the rising portions 32, 33 of the film sensor 3. In the present embodiment, both ends of the second transparent electrodes 6 extend to the rising portions 32, 33 (refer to FIG. 17), which is different from the first embodiment.

This configuration allows the sensing area to be formed beyond the outer periphery of the top plate 21, so that it becomes further ensured that the frame of the decorated area 2B in the top plate 21 is narrowed or that the decorated area 2B is frameless. In addition, the portion of the decorated area 2B that covers the first side plate 22 and the second side plate 23 can be utilized for inputting.

In the case where the transparent electrodes are also formed in the rising portions of the film sensor, it is preferable that the transparent electrodes are formed as a conductive patterned layer including silver nanofiber or carbon nanotube in the binder resin. Since the conductive patterned layer including silver nanofiber or carbon nanotube (CNT) has an excellent flexibility and formability, the transparent electrodes made of either of them is not damaged due to the bending of the film sensor 3. In addition, according to the present embodiment, it is preferable that the optically transparent adhesive 10 used for adhering the film sensor 3 to the cover lens 2 is provided not only on the rear surface of the top plate 21 of the cover lens 2, but also on the rear surfaces of the first side plate 22 and the second side plate 23.

The material for the transparent electrodes may also preferably be polyethylenedioxythiophene (PEDOT).

Fourth Embodiment

Figure 6:
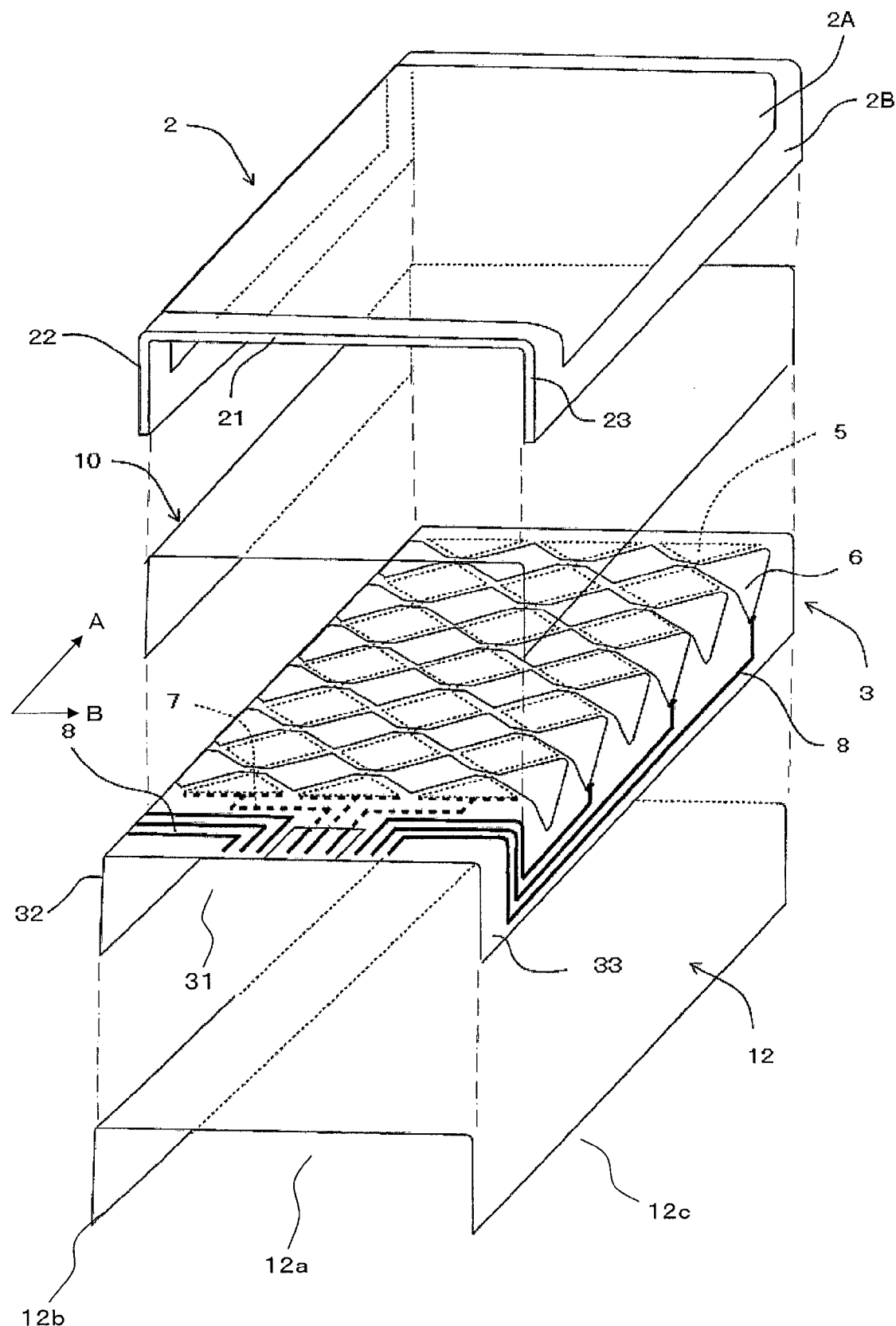
FIG. 6 is an exploded perspective view showing the other embodiment of the capacitance type touch screen.

In the touch screen according to the present embodiment, the flexible display 12 is disposed on the rear surface of the film sensor 3 formed with the rising portions 32, 33. More specifically, the flexible display 12 includes a main surface portion 12a and a rising portion 12b. The see-through area 2A of the cover lens 2 extends not only to the top plate 21 but also to the first side plate 22 and the second side plate 23 (refer to FIG. 6), which is different from the third embodiment.

This configuration allows users to input instructions by touching the first side plate 22 and the second side plate 23 of the cover lens 2 too, while seeing through the display screen. It is possible to use, as the flexible display 12, a publicly known flexible display as well as organic light emitting diode (OLED), and electronic papers. It is acceptable that the flexible display 12 and the film sensor 3 are bonded to each other.

Fifth Embodiment

In the touch screen according to the present embodiment, the film sensor 3 has been molded so as to have rising portions before the film sensor 3 is adhered to the cover lens 2, which is different from the first embodiment.

Since this configuration allows the film sensor 3 to be adhered to the cover lens 2 without bending the film sensor 3 along the rear surface of the cover lens 2, it becomes easy for the film sensor 3 to be adhered to the cover lens 2, and it becomes possible to reliably bend the film sensor 3 to a certain shape.

Figure 11:
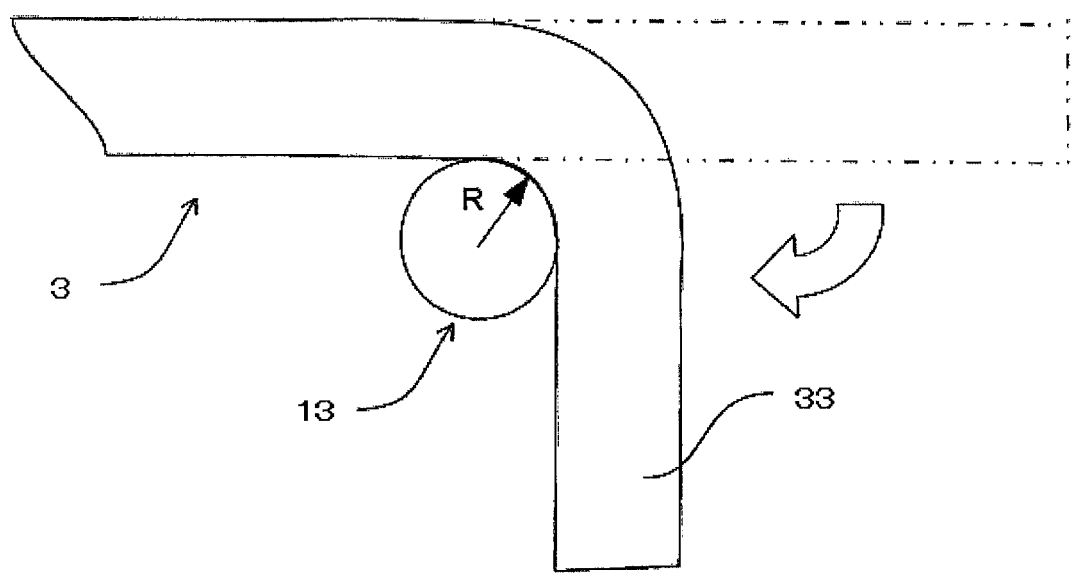
FIG. 11 is a sectional view showing one example of a process of forming the film sensor.

Preferably, the film sensor 3 is molded with a R bending process (Refer to FIG. 11). The R bending process is a process of rounding the corner portions, so as to form not a right angle. One of the methods of the R bending process is, for example, to place a portion of the film sensor 3 to be bent along a center line of a heater (pipe heater) 13 protected by a stainless pipe or the like, to heat and soften the portion of the film sensor 3 in contact with the pipe heater 13, and to bend it to a target angle quickly after it is sufficiently softened. The inside R size of the R bending process is 1 to 4 mm in the above-mentioned film sensor 3. It should be noted that methods other than the above-described method can also be employed as a method of the R bending.

Function and Effects of the Embodiment

The capacitance type touch screen 1 (one example of the touch screen) includes a cover lens 2 (one example of the cover lens) and the film sensor 3 (one example of the film sensor).

The cover lens 2 includes the top plate 21 (one example of the top plate) and the first side plate 22 and the second side plate 23 that are connected to two sides of the top plate 21 in B direction (one example of the second direction) that is perpendicular to A direction (one example of the first direction) of the top plate 21. The cover lens 2 includes a see-through area 2A (one example of the see-through area), and a decorated area 2B (one example of the decorated area) other than the see-through area 2A. The film sensor 3 is adhered to the rear surface of the cover lens 2.

The film sensor 3 includes the base film 4 (one example of the base film), the plurality of first transparent electrodes 5 (one example of the first transparent electrodes), the plurality of second transparent electrodes 6 (one example of the second transparent electrodes), the plurality of first lead wirings 7 (one example of the first lead wirings), and the plurality of second lead wirings 8 (one example of the second lead wirings). The plurality of first transparent electrodes 5 are arranged side by side on the base film 4 and extending in A direction. The plurality of second transparent electrodes 6 are insulated from the first transparent electrodes 5, and extend in B direction while being arranged side by side, crossing the first transparent electrodes 5. The plurality of first lead wirings 7 are connected to the first transparent electrodes 5, and drawn to connection terminals. The plurality of second lead wirings 8 are connected to the second transparent electrodes 6, and are drawn to connection terminals.

The first lead wirings 7 and the second lead wirings 8 are hidden by the decorated area 2B of the cover lens 2.

The film sensor 3 includes a top plate-corresponding portion 31 (one example of the top plate corresponding portion) opposite to the rear surface of the top plate 2A of the cover lens 2, and rising portions 32, 33 (one example of the rising portion) facing at least one of the rear surfaces of the first side plate 22 and the second side plate 23.

All or most of the second lead wirings 8 is positioned in the rising portions 32, 33.

Since the capacitance type touch screen 1 is configured as described above, the position where the second lead wirings 8 are formed is not limited to within the top plate 21A of the cover lens 2, and the inner edge of the decorated area 2B hiding the second lead wirings 8 can be formed very close to the outer periphery of the top plate 21A, thereby achieving non-conventional frame narrowing of the decorated area of the top plate, or a frameless top plate.

Variations

Although one embodiment according to the present invention was explained above, the present invention is not limited to the above-described embodiment. The embodiment can be altered in various ways without departing from the scope of the present invention. Particularly, a plurality of embodiments and variations can be arbitrarily combined with each other as necessary.

Figure 12:
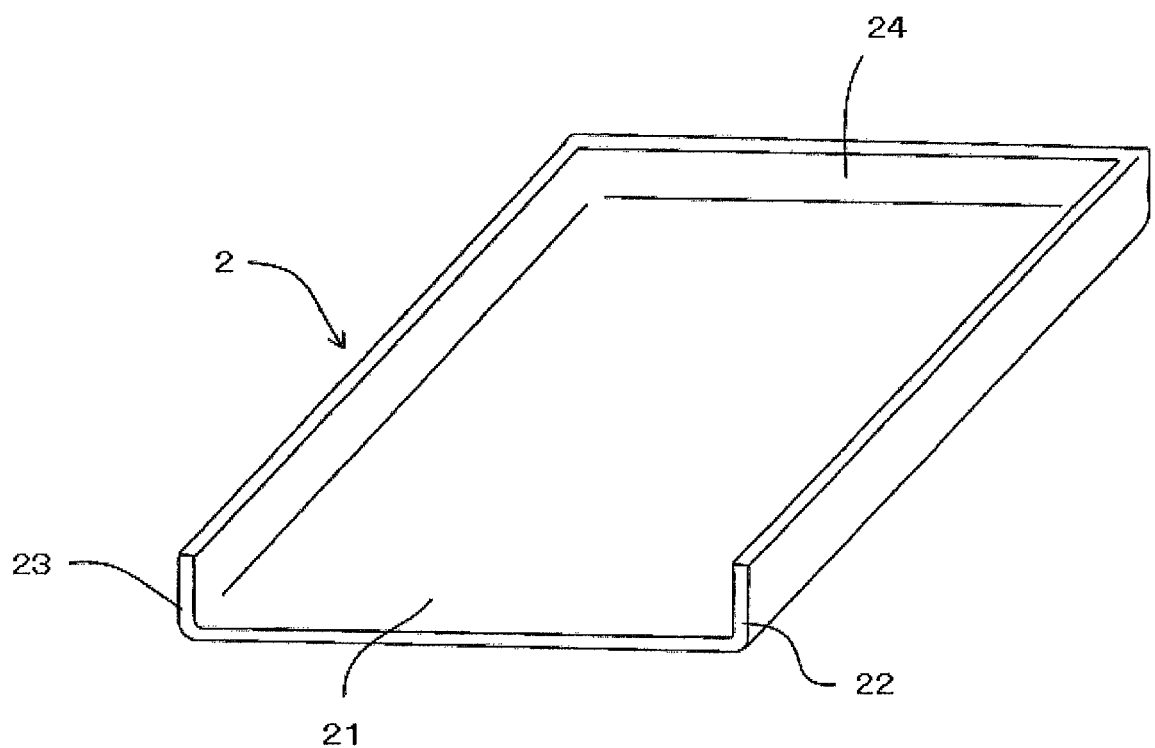
FIG. 12 is a perspective view showing a variation of the cover lens according to the disclosed embodiments.

(a) A casing structure can be employed in which the cover lens 2 includes a third side surface plate 24 of a thin rectangle formed along a side opposite to the side 21A near the connection terminals 11, where the first side plate 22 and the second side plate 23 of the top plate 21 are not formed. In this structure, right and left ends of the third side surface plate 24 are continuously connected respectively with the first side plate 22 and the second side plate 23 (refer to FIG. 12).

Figure 13:
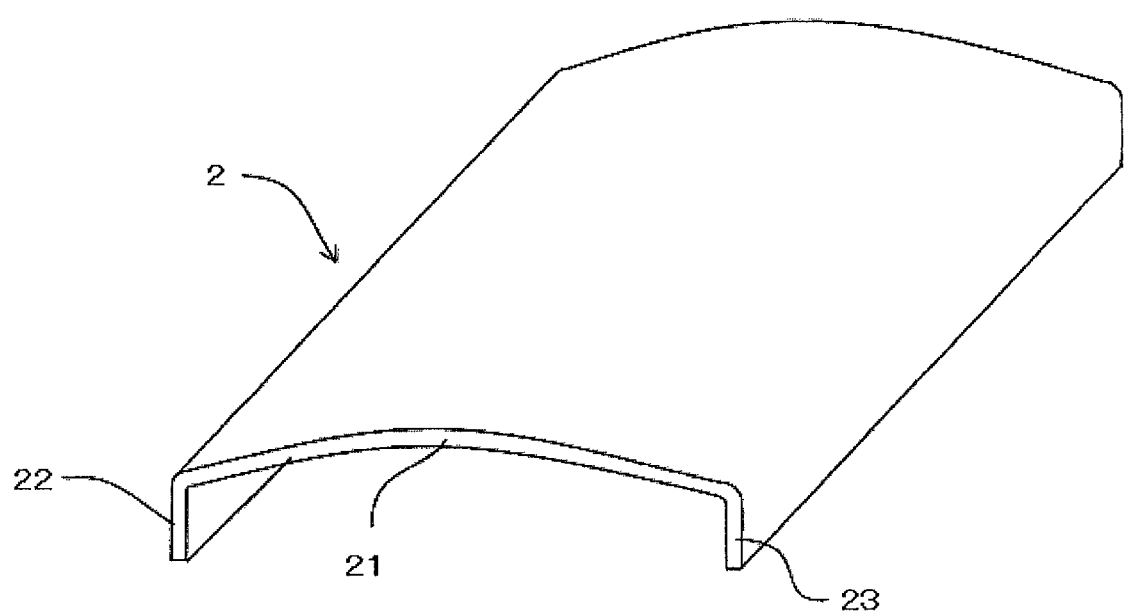
FIG. 13 is a perspective view showing a variation of the cover lens according to the disclosed embodiments.

(b) In the description of the first embodiment, it is mentioned that the top plate 21 of the cover lens 2 is typically preferably planar. However, as shown in FIG. 13, a curved surface can be used as the cover lens 2 having a shape in which the surface is evenly rising as it approaches the center line from the first side plate 22 and the second side plate 23. Such a curved surface can be used because it does not exert any bonding difficulty, similar to the case of a planar surface.

In the above-described embodiments and the variations, boundaries between the top plate and the side surface plates are clear and the side surface plates are flat plates. However, the present invention can be applied to a shape in which the top plate and the side plates are continuous with each other, with curvature, so that the boundaries between the top plate and the side plates are not necessarily clear (not shown).

Figure 15:
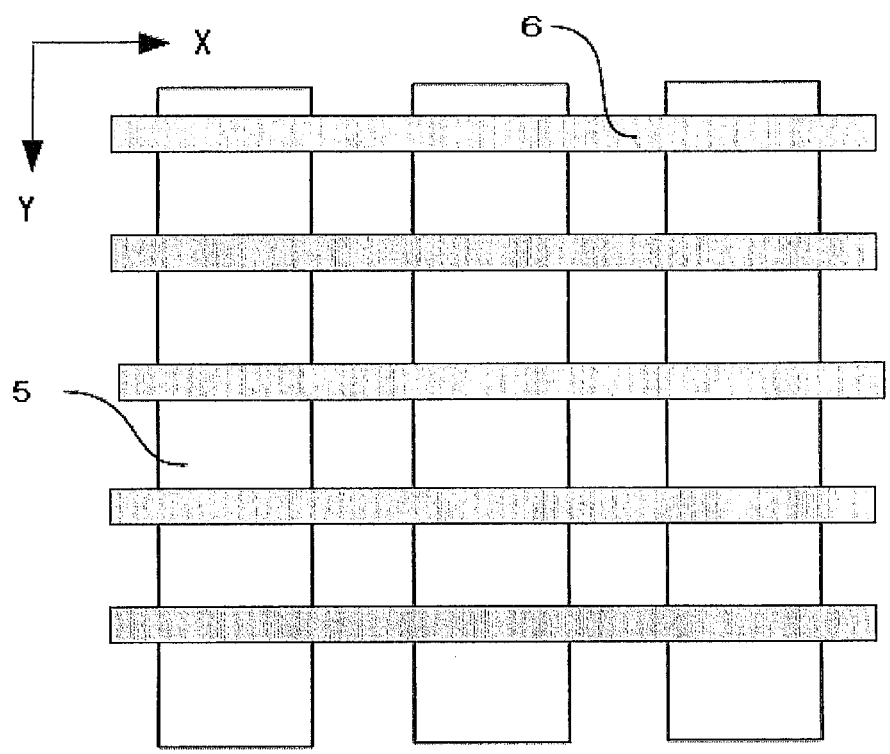
FIG. 15 is a partially enlarged view showing one example of the transparent electrode portion of the film sensor.

(c) Although in the above-described embodiments, the transparent electrodes 5, 6 are arranged so as to have the rhombic electrodes 51 and the rhombic electrodes 61 spread out (self capacitance), the transparent electrodes 5, 6 of the film sensor 3 are not limited to this embodiment. For example, as shown in FIG. 15, the transparent electrode 5, 6 may be band electrodes arranged in a matrix (mutual capacitance).

(d) According to the above-described embodiments, although the film sensor 3 includes rising portions to face the rear surfaces of the top plate 21, the first side plate 22, and the second side plate 23 of the cover lens 2, the film sensor 3 is not limited to this example. For example, the film sensor 3 may have a rising portion to face the rear surface of the top plate 21 and one of the first side plate 22 and the second side plate 23 of the cover lens 2.

Figure 5:
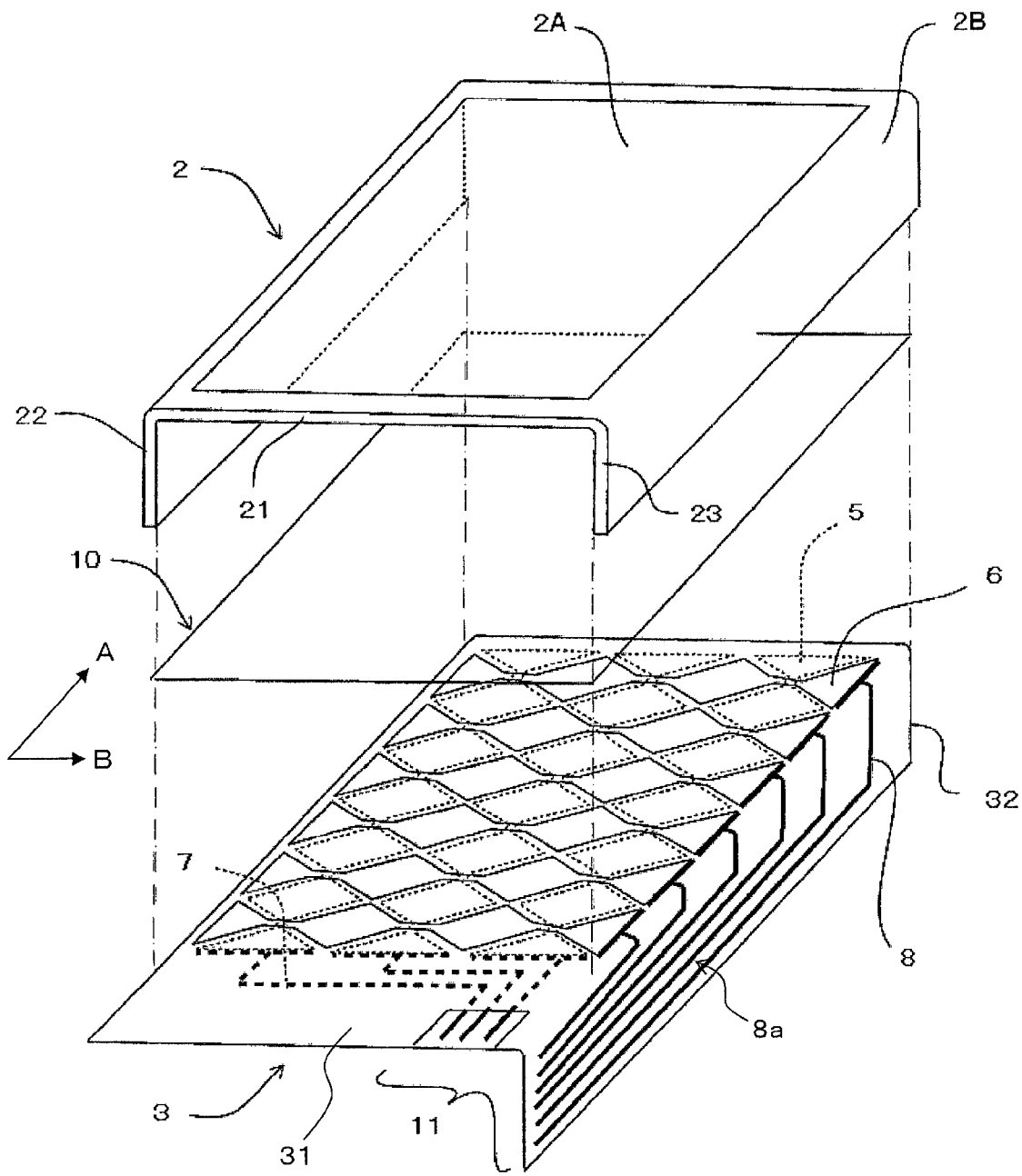
FIG. 5 is an exploded perspective view showing the other embodiment of the capacitance type touch screen.

In the example shown in FIG. 5, the film sensor 3 has a rising portion 32 facing the first side plate 22. Accordingly, the second lead wirings 8 has only a first portion 8*a* corresponding to the rising portion 32, 33. More specifically, the first portion 8*a* includes a portion extending from the second transparent electrodes 6 in the width direction of the rising portions 32, 33, and a portion extending in the length direction of the rising portions 32, 33 (A direction in the figure).

(e) As shown in FIG. 1, FIG. 3 and FIG. 5, in a case where the optically transparent adhesive 10 is disposed only on the rear surface of the top plate 21, it is acceptable that the lead line wirings of the film sensor 3 disposed on a portion corresponding to the first side plate and the second side plate are protected by an insulation layer. The configuration prevents the lead line wirings from being rubbed and damaged by the rear surfaces of the first side plate and the second side plate (not shown).

(f) The first side plate 22, the second side plate 23, and the third side surface plate 24 of the cover lens 2 may be formed with cutout portions at the lower end or right and left ends for headphone terminals or the like, or with claw portions for engaging the cover lens 2 or the like (not shown).

The present invention relates to a capacitance type touch screen incorporated into a part of a casing of the personal digital assistants such as PDAs and handy terminals, OA equipment such as copy machines and facsimiles, and various home appliances such as smartphones, cellular phones, portable game devices, electronic dictionaries, car navigation systems, and small PCs.

The invention claimed is:

1. A capacitance type touch screen, comprising:
   a cover lens including a top plate, and a first side plate and a second side plate connected to two sides of the top plate along a second direction perpendicular to a first direction of the top plate, the cover lens having a see-through area and a decorated area other than the see-through area; and
   a film sensor adhered to a rear surface of the cover lens;
   the film sensor including:
      a base film;
      a plurality of first transparent electrodes arranged on the base film side by side, extending in the first direction;
      a plurality of second transparent electrodes arranged side by side so as to extend in the second direction and cross the first transparent electrodes, while being insulated from the plurality of first transparent electrodes;
      a plurality of first lead wirings connected the first transparent electrodes and drawn to connection terminals; and
      a plurality of second lead wirings connected to the second transparent electrodes and drawn to connection terminals;
   the first lead wirings and the second lead wirings are hidden by the decorated area of the cover lens,
   the film sensor includes a top plate corresponding portion opposite to the rear surface of the top plate of the cover lens, and a rising portion facing at least one of the rear surfaces of the first side plate and the second side plate, and
   all or most of the second lead wirings are positioned in the rising portion.

2. The capacitance type touch screen according to claim 1, wherein
   an inside R size of a bent portion of the film sensor is 1 to 4 mm.

3. The capacitance type touch screen according to claim 1, wherein
   a part of the second transparent electrodes is positioned in the rising portion.

4. The capacitance type touch screen according to claim 3, wherein
   the transparent electrodes positioned in the rising portion are formed as a conductive patterned layer including a binder resin and silver nanofiber or carbon nanotube in the binder resin.

5. The capacitance type touch screen according to claim 3, further comprising a flexible display disposed on the rear surface of the film sensor, the flexible display having a second rising portion corresponding to the rising portion of the film sensor, wherein
   the see-through area of the cover lens extends from the top plate to the side plate, facing the rising portion of the film sensor.

6. The capacitance type touch screen according to claim 1, wherein
   the film sensor has been molded so as to have the rising portion before the film sensor is adhered to the cover lens.

7. The capacitance type touch screen according to claim 1, wherein
   the film sensor has been molded so as to extend along the first side plate and the second side plate of the cover lens.

8. The capacitance type touch screen according to claim 1, wherein
   a lower end of the rising portion of the film sensor is positioned lower than a lower end of the at least one of the first side plate and the second side plate.

9. The capacitance type touch screen according to claim 1, wherein
   the film sensor includes a first base film supporting the first transparent electrodes and the first lead wirings, and a second base film supporting the second transparent electrodes and the second lead wirings, the second base film being different from the first base film in size,
   the first base film corresponds to only the rear surface of the top plate, and
   the second base film includes a first portion corresponding to the rear surface of the top plate, and a second portion and a third portion respectively corresponding to the rear surfaces of the first side plate and the second side plate.

10. The capacitance type touch screen according to claim 2, wherein
    a part of the second transparent electrodes is positioned in the rising portion.

11. The capacitance type touch screen according to claim 10, wherein
    the transparent electrodes positioned in the rising portion are formed as a conductive patterned layer including a binder resin and silver nanofiber or carbon nanotube in the binder resin.

12. The capacitance type touch screen according to claim 10, further comprising a flexible display disposed on the rear surface of the film sensor, the flexible display having a second rising portion corresponding to the rising portion of the film sensor, wherein
    the see-through area of the cover lens extends from the top plate to the side plate, facing the rising portion of the film sensor.

13. The capacitance type touch screen according to claim 4, further comprising a flexible display disposed on the rear surface of the film sensor, the flexible display having a second rising portion corresponding to the rising portion of the film sensor, wherein the see-through area of the cover lens extends from the top plate to the side plate, facing the rising portion of the film sensor.

14. The capacitance type touch screen according to claim 11, further comprising a flexible display disposed on the rear surface of the film sensor, the flexible display having a second rising portion corresponding to the rising portion of the film sensor, wherein the see-through area of the cover lens extends from the top plate to the side plate, facing the rising portion of the film sensor.

15. The capacitance type touch screen according to claim 2, wherein the film sensor has been molded so as to have the rising portion before the film sensor is adhered to the cover lens.

16. The capacitance type touch screen according to claim 2, wherein the film sensor has been molded so as to extend along the first side plate and the second side plate of the cover lens.

17. The capacitance type touch screen according to claim 2, wherein a lower end of the rising portion of the film sensor is positioned lower than a lower end of the at least one of the first side plate and the second side plate.

18. The capacitance type touch screen according to claim 2, wherein the film sensor includes a first base film supporting the first transparent electrodes and the first lead wirings, and a second base film supporting the second transparent electrodes and the second lead wirings, the second base film being different from the first base film in size, the first base film corresponds to only the rear surface of the top plate, and the second base film includes a first portion corresponding to the rear surface of the top plate, and a second portion and a third portion respectively corresponding to the rear surfaces of the first side plate and the second side plate.

* * * * *